United States Patent
Yashiro et al.

(10) Patent No.: US 7,109,624 B2
(45) Date of Patent: Sep. 19, 2006

(54) SYNCHRONOUS ELECTRIC MACHINE

(75) Inventors: Haruki Yashiro, Yokohama (JP);
Hisaaki Toujima, Yokohama (JP);
Kazuhiro Ooki, Higashiosaka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/077,209

(22) Filed: Mar. 11, 2005

(65) Prior Publication Data

US 2005/0200222 A1 Sep. 15, 2005

(30) Foreign Application Priority Data

Mar. 11, 2004 (JP) ............................. 2004-069222

(51) Int. Cl.
*H02K 21/12* (2006.01)
(52) U.S. Cl. ..................... 310/156.45; 310/156.53; 310/156.56
(58) Field of Classification Search ........... 310/156.45, 310/261, 152, 156.01, 179, 180, 156.53, 310/156.56, 156.74
See application file for complete search history.

(56) References Cited

U.S. PATENT DOCUMENTS

| | | | | |
|---|---|---|---|---|
| 5,811,904 A | * | 9/1998 | Tajima et al. | 310/156.45 |
| 5,818,139 A | * | 10/1998 | Yamagiwa et al. | 310/156.45 |
| 6,008,559 A | * | 12/1999 | Asano et al. | 310/156.53 |
| 6,133,662 A | * | 10/2000 | Matsunobu et al. | 310/156.53 |
| 2003/0193253 A1 | | 10/2003 | Arimitsu et al. | |

FOREIGN PATENT DOCUMENTS

JP 2001-0359266 A 12/2001

\* cited by examiner

*Primary Examiner*—Tran Nguyen
(74) *Attorney, Agent, or Firm*—Foley & Lardner LLP

(57) ABSTRACT

A synchronous electric machine includes a stator and a rotor. The stator is provided with teeth, which are wound around to establish electromagnetic fields. The rotor is provided with permanent magnets to generate magnetic fields, so that the rotor can rotate by interaction of the magnetic fields of the windings and the permanent magnets of the magnets. At least one pair of the permanent magnets is dislocated by a predetermined angle from positions where the permanent magnets is arranged at even pitch, and the predetermined angle being set to reduce electromagnetic excitation force acting on said teeth.

15 Claims, 13 Drawing Sheets

SYNCHRONOUS ELECTRIC MACHINE

BACKGROUND OF THE INVENTION

1. Field of the Invention

The present invention relates to a synchronous electric machine having a stator with windings and a rotor with permanent magnets so that the rotor can be rotatable in the stator by mutual interaction between electromagnetic fields of the windings and magnetic fields of the permanent magnets.

2. Description of the Related Art

A synchronous electric machine of this kind is disclosed in Japanese patent laying-open publication No. Hei 07-255159. This electric machine acts as an electric motor and includes a rotor with permanent magnets to generate magnetic fields and a stator with windings to establish electromagnetic fields. The magnets are arranged at an uneven pitch along a circumference of the rotor so that the magnets are dislocated forward and backward by 30 degrees in an electric angle from the positions where they are placed at an even pitch. Specifically, the number of pole pairs is set to be an even number, one of pole pairs is set at 330 degrees in the electric angle and the other of pole pairs is set at 390 degrees in the electric angle. This causes that electromotive powers generated in U-phase windings are, for example, different forward and backward in phase between the two windings, so that their combined electric power changes in a step configuration, not in a rectangular configuration, in the rise and drop of the electromotive power. This brings the waveform of the electromotive power in each-phase winding to have a sinusoidal-like configuration, which in turn the terminal voltages between the U-, V-, and W- phases also have sinusoidal-like configurations. The sinusoidal-like configuration improves its control characteristics and running efficiency.

The above known conventional synchronous electric machine, however, encounters a problem that it can not decrease vibration or high-frequency electromagnetic noise of the stator caused by electromagnetic excitation forces acting on teeth of the stator. Because the conventional electric machine allows for only improvement of the control characteristics and running efficiency, which requires the dislocated angle of the magnets to be set ±30 degrees in the electric angle and 15 degrees in a mechanical angle.

It is, therefore, an object of the present invention to provide a synchronous electric machine which overcomes the foregoing drawbacks and can decrease electromagnetic excitation force acting on a stator and causing a high-frequency electromagnetic noise.

SUMMARY OF THE INVENTION

According to a first aspect of the present invention there is provided a synchronous electric machine comprising: a stator provided with teeth wound around by windings capable of generating electromagnetic fields; and a rotor provided with permanent magnets generating magnetic fields, said rotor being capable of rotating by interaction of the electromagnetic fields of the windings and the magnetic fields of the permanent magnets; wherein the permanent magnets of at least one pair of the permanent magnets are dislocated by a predetermined angle from positions where the permanent magnets are arranged at even pitch, and the predetermined angle being set to reduce electromagnetic excitation force acting on the teeth.

Note that the synchronous electric machine of the present invention includes not only a synchronous electric motor that can produce mechanical power from electrical power, but also a synchronous generator that can generate electric power from mechanical power, and a synchronous electric motor/generator that can shift between an electric motor to output mechanical power and an electric generator to generate electric power.

BRIEF DESCRIPTION OF THE DRAWINGS

The objects, features and advantages of the present invention will become apparent as the description proceeds when taken in conjunction with the accompanying drawings, in which.

DETAILED DESCRIPTION OF THE PREFERRED EMBODIMENTS

Figure 1:
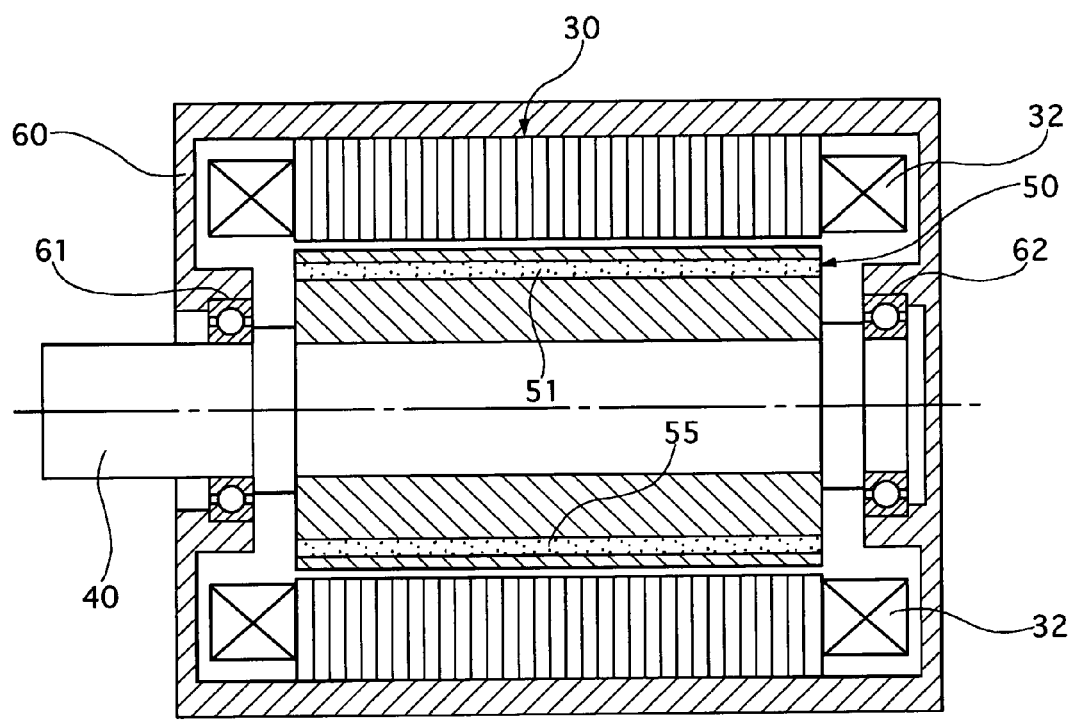
FIG. 1 is a longitudinal sectional view showing a synchronous electric machine according to a first preferred embodiment of the present invention.

Throughout the following detailed description, similar reference characters and numbers refer to similar elements in all figures of the drawings, and their descriptions are omitted for eliminating duplication.

Figure 2:
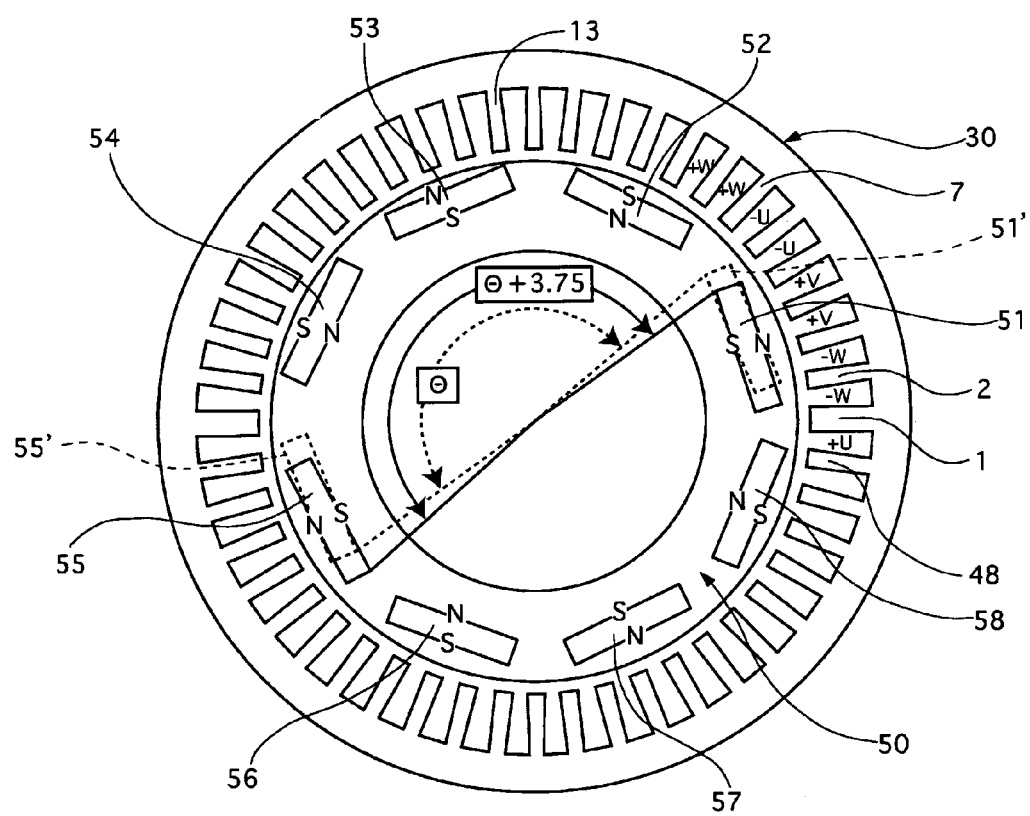
FIG. 2 is a cross sectional view showing a stator and a rotor used in the synchronous electric machine of the first embodiment shown in FIG. 1.

Referring to FIGS. 1 and 2 of the drawings, there is shown a first preferred embodiment of a synchronous electric machine according to the present invention. FIG. 1 shows a longitudinal sectional view of the electric machine of the first embodiment, and FIG. 2 shows a cross sectional view of a stator and a rotor used in the electric machine shown in FIG. 1.

The synchronous electric machine of this embodiment is a synchronous three-phase motor having four pole pairs and distributed windings wound around forty eight stator teeth, which tends to be in wide usage because of its high output power and low vibration. The machine has a stator 30, a rotor 50 rotatable in the stator 30, and a motor case 60 containing the stator 30 and the rotor 50.

The stator 30 is made up of laminated steel sheets that are integrally formed to be in a circular cylinder shape having forty eight teeth 1 to 48 at its inner portion facing an outer surface of the rotor 50. Forty eight slots are formed between the adjacent teeth 1 to 48 so as to receive windings 32 consisting of U-phase windings, V-phase windings, and W-phase windings, which are wound around every tooth 1 to 48 for obtaining high output torque and a wide driving range. The U-, V-, and W-phase windings are electrically connected to a motor driver, not shown, controlled by a not-shown controller, so that the windings 32 and teeth 1 to 48 can act as electromagnets. The motor driver provides the U-, V-, and W-windings with alternating volts of different phases from one another by 120 degrees, respectively, which brings the rotor 50 to run at a rotational speed related to the frequency of the volts supplied to the windings 32 of the stator 30.

The rotor 50 is also made up of laminated steel sheets that are integrally formed a circular cylinder shape insertable into the stator 30, and is fixed at its inner surface portion with a rotating shaft 40 by press-fit, bolts, or the like. The rotating shaft 40 is rotatably supported at its both end portions by the motor case 60 thorough roller ball bearings 61 and 62. The rotor 50 is provided in its outer peripheral portion with eight interior permanent magnets 51 to 58, which are magnetized in its thickness direction such that the north pole is located at one of an outer surface and an inner surface of the magnets 51 to 58 and the south pole is located at the other of them. The adjacent magnets 51 to 58 are arranged to have alternately reversed poles. When the rotor 50 is assembled into the stator 30, magnetic paths are produced by the permanent magnets 51 to 58 of the rotor 50 and the electromagnets of the stator 30.

In this first embodiment, the electric machine is set to decrease forty-eighth-order-mode electromagnetic excitation force. Accordingly, the permanent magnets 51 to 58 of the rotor 50 are arranged at an uneven pitch in a circumferential direction of the rotor 50 as follows. One pair of the permanent magnets, consisting of the magnets 51 and 55, are placed at positions dislocated by a predetermined angle from positions where magnets 51' and 55' respectively corresponding to the magnets 51 and 55 are positioned at the even pitch. The angle of the pair of the magnets 51 and 55 is given by the following equation.

$$\Theta+360/(2\times n) \text{ degrees}=\Theta+3.75 \text{ degrees},$$

where $\Theta$ is an angle between the pair of the corresponding magnets 51' and 55', and n is an integral number (value) of an order-mode of vibration to be decreased. In this case shown in FIG. 2, $\Theta=180$ degrees and n=48. This dislocated angle of the pair of the magnets 51 and 55, therefore, becomes 3.75 degrees. The dislocated angle corresponds to a predetermined angle of the present invention.

Next, the reduction operation of the electromagnetic excitation forces acting on the teeth 1 to 48 of the stator 30 will be described with reference to the accompanying drawings.

Figure 3:
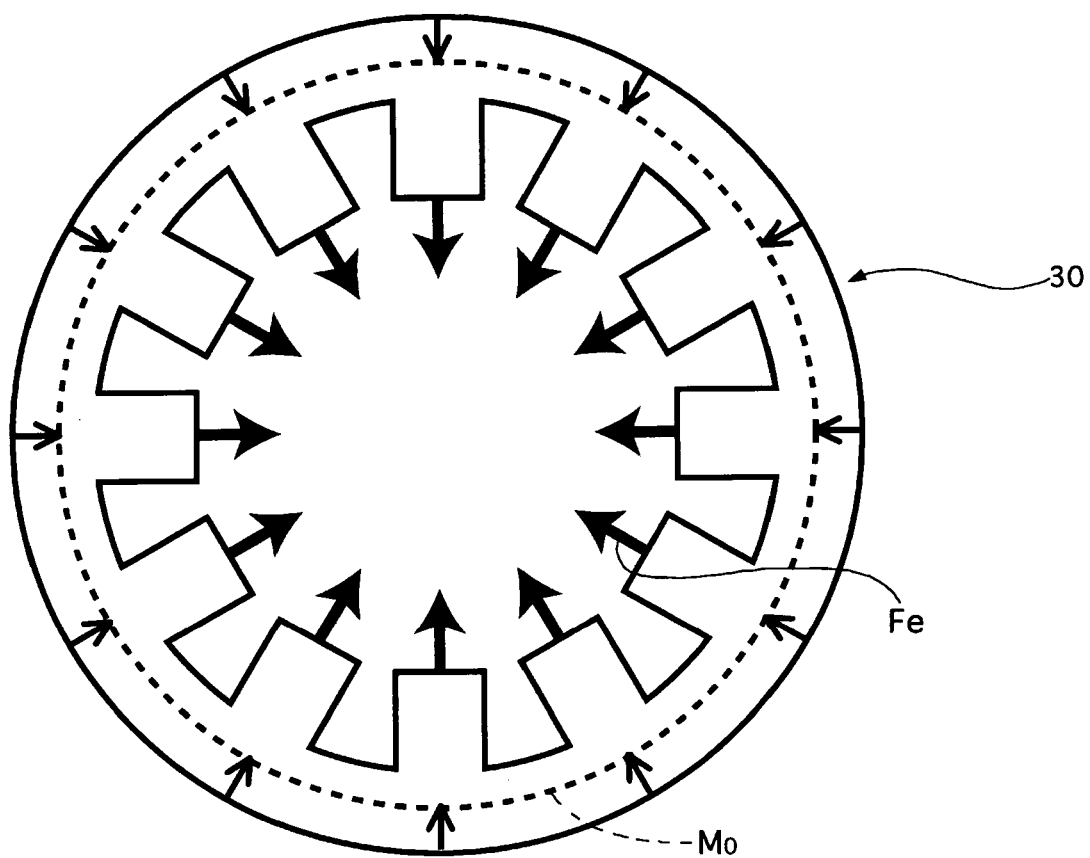
FIG. 3 is a schematic diagram showing a state of a zeroth-order-mode circular vibration of the stator shown in FIGS. 1 and 2.

FIG. 3 shows a zeroth-order-mode circular vibration of the stator 3, which causes a main problem of high frequency noise outputted from the stator 30 of the electric machine. In FIG. 3, the rotor 50, the windings 32, and the others are omitted, and the number of the teeth are illustrated less than those shown in FIG. 2 for clear understanding of a vibration mode.

As shown in FIG. 3, the permanent magnet 51 to 58 of the rotor 50 and the windings of the stator 30 generate electromagnetic variation therebetween to apply the electromagnetic excitation forces Fe to the teeth 1 to 48 in a centripetal direction of the stator 30. This causes a zeroth-order-mode circular vibration, indicated by a dotted line M0, of the stator 30, thereby causing a motor noise. The zeroth-order-mode circular vibration designates a circular vibration having no node. The electromagnetic excitation forces Fe acting on the teeth 1 to 48 simultaneously produces a multiple-number-order-mode circular vibration in addition to the zeroth-order-mode circular vibration.

Figure 4:
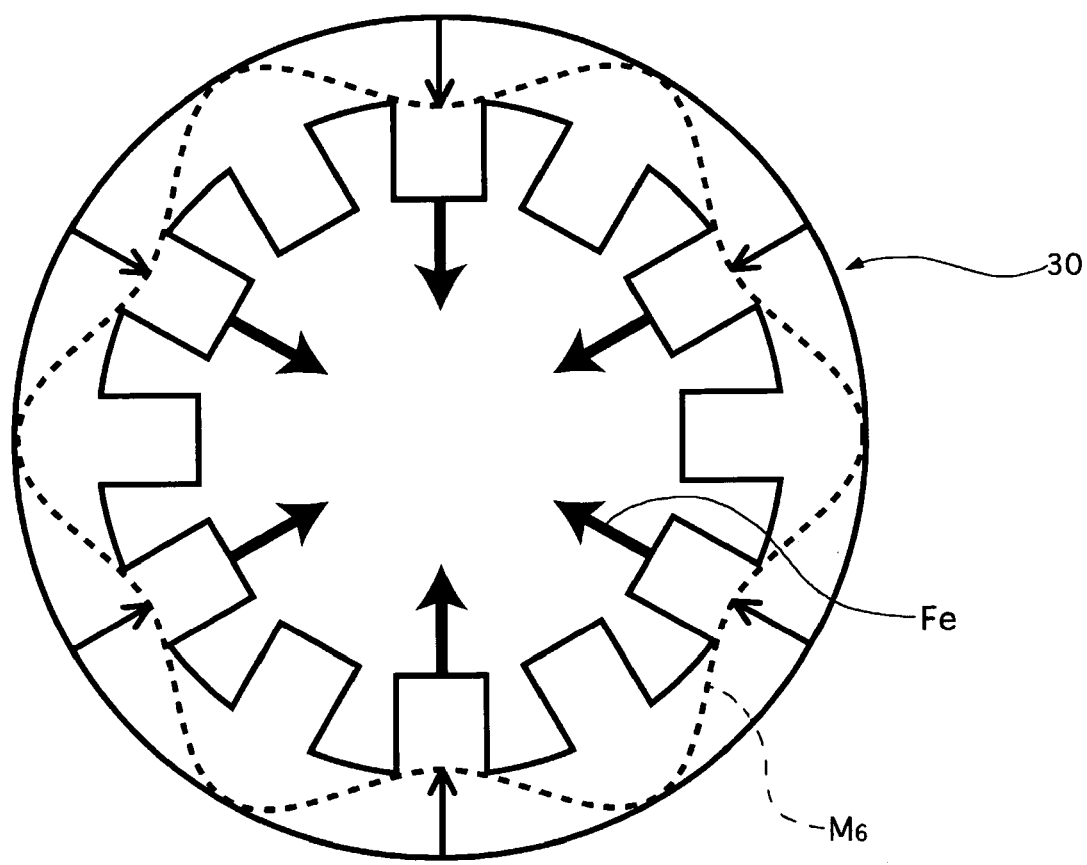
FIG. 4 is a schematic diagram showing a state of a sixth-order-mode circular vibration of the stator shown in FIGS. 1 and 2.

For example, FIG. 4 shows a sixth-order-mode circular vibration, having six nodes, of the stator 30 produced by the electromagnetic excitation forces Fe, where the six-order-mode circular vibration is indicated by a dotted line $M_6$. A mode configuration of the sixth-order-mode circular vibration has repeating convexo-concave portions, so that the change efficiency to radiated noise in the sixth-order-mode circular vibration is smaller than that in the zeroth-order-mode circular vibration having a mode configuration without convexo-concave portions as shown in FIG. 3.

As mentioned above, in the electric machine of the first embodiment, the electromagnetic excitation force Fe causing the zeroth-order-mode circular vibration is reduced by decreasing a certain nth-order-mode high frequency component of the electromagnetic excitation force vibration. The nth-order is determined preferably by selecting a component having the larger amount of the electromagnetic excitation force.

In order to understand the advantages of the electric machine of the first embodiment, the similar typed, a four pole-pair and forty eight teeth typed, electric motor having a rotor with magnets arranged at an even pitch will be introduced and described with reference to the accompanying drawings of FIGS. 5 to 7 for comparison.

Figure 5:
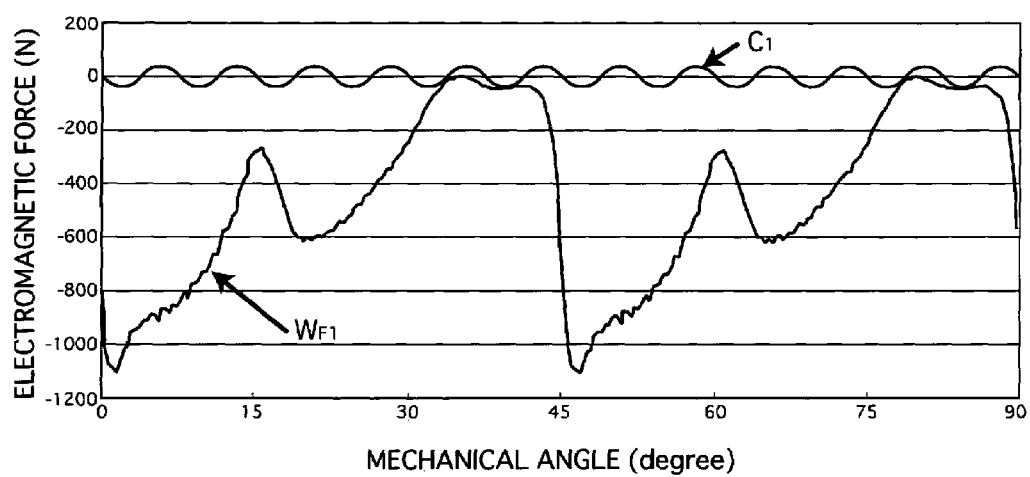
FIG. 5 is a characteristic diagram showing a relationship obtained by computations between a mechanical angle, a waveform of electromagnetic force acting on a first tooth of the stator, shown in FIG. 2, with magnets arranged at an even pitch, and a waveform of a forty-eighth-order-mode component of the electromagnetic force waveform.
Figure 6:
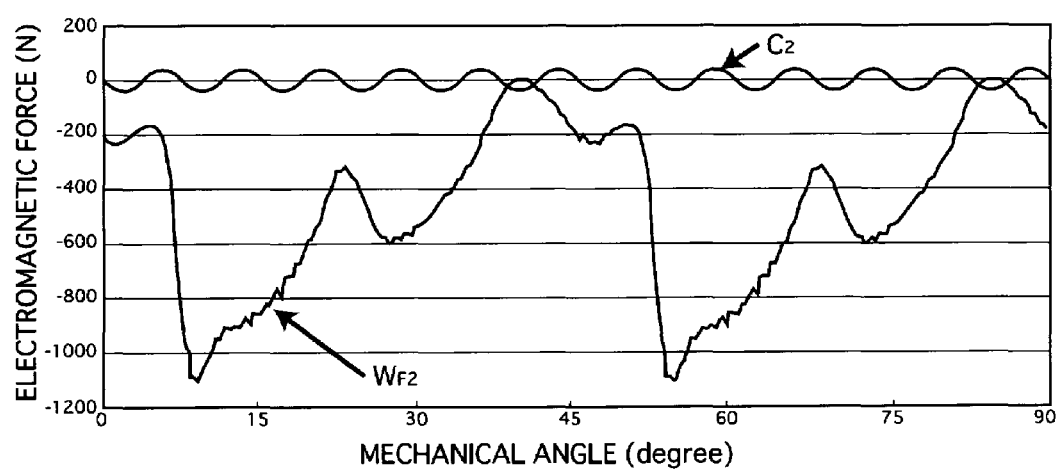
FIG. 6 is a characteristic diagram showing a relationship obtained by computations between the mechanical angle, a waveform of electromagnetic force acting on a second tooth of the stator when the magnets of the rotor are arranged at the even pitch, and a waveform of a forty-eighth-order-mode component of the electromagnetic force waveform.
Figure 7:
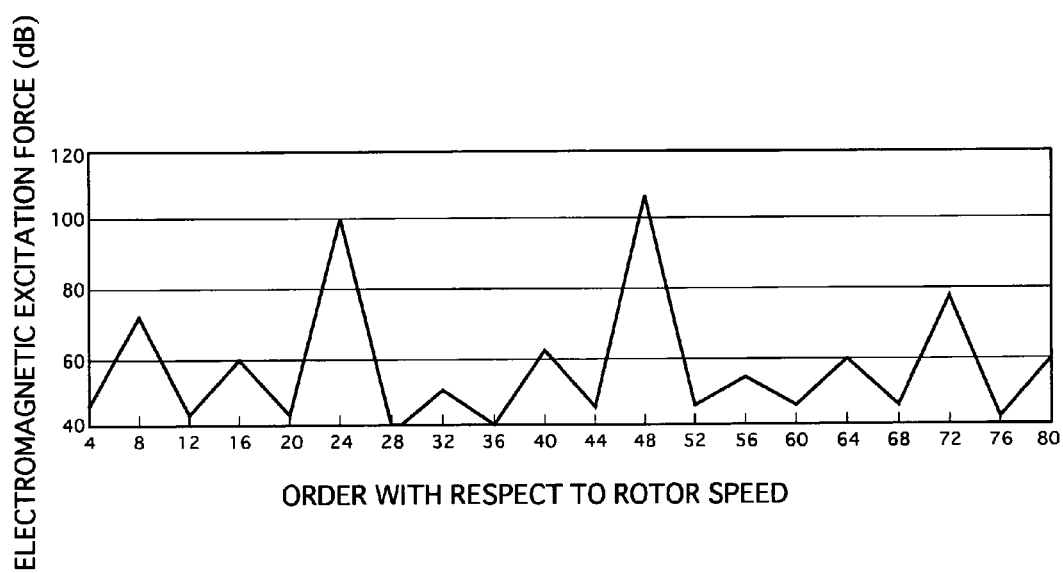
FIG. 7 is a frequency characteristic diagram showing a relationship obtained by computations between an order with respect to a rotor speed and a spectrum of electromagnetic excitation force in the zeroth-order-mode circular vibration of the stator.

FIG. 5 shows an analysis of electromagnetic force acting on a tooth 1 of a stator at a constant rotational speed used under the typical motor running condition with respect to a mechanical angle, and FIG. 6 shows an analysis of electromagnetic force acting on a tooth 2 of the stator at the constant rotating speed with the mechanical angle. As shown in FIG. 5, the electromagnetic force acting on the tooth 1 has a waveform $W_{F1}$ and a forty-eighth-order-mode component of the electromagnet force has a waveform $C_1$. As shown in FIG. 6, the electromagnetic force acting on the tooth 2 has a waveform $W_{F2}$ and a forty eighth-order-mode component of the electromagnet force has a waveform $C_2$.

The electromagnetic forces are characterized by its centripetal direction, an attraction direction toward the rotor. The amounts of the electromagnetic excitation forces causing a zeroth-order-mode circular vibration of the stator can be estimated by calculating electromagnetic forces acting on the teeth, which are substantially the same at every tooth of the stator. FIG. 7 is a frequency characteristic diagram showing a relationship obtained by using Fourier Analysis between the order with respect to rotor speed and the electromagnetic excitation force causing the zeroth-order-mode circular vibration of the stator, resulting in the fact that a twenty-fourth-order-mode component and a forty-eighth-order mode component of the electromagnetic excitation force are larger than other-order-mode components. The twenty-fourth-order mode component is a component having a twenty-four-time speed compared to a rotating speed of the rotor, and the forty-eight-order-mode component is a component having a forty-eight-time speed compared to the rotating speed of the rotor.

Therefore, the electric machine of the first embodiment aims to decrease, for example, the forty-eighth-order-mode electromagnetic excitation force acting on every tooth of the stator. In order to decrease the forty-eighth-order-mode component electromagnetic excitation force caused at the first tooth by interaction of electromagnetic field produced by windings and magnetic field produced by the magnets, other magnets are arranged so that they can apply forty-eighth-order-mode electromagnetic force phase-shifted by 180 degrees. Specifically, one pair of the magnets is set to be the magnets 51 and 55, which are arranged at Θ+360/(2×n) degrees =Θ+3.75 degrees, where Θ=180 degrees and n=48 in this electric machine.

Figure 8:
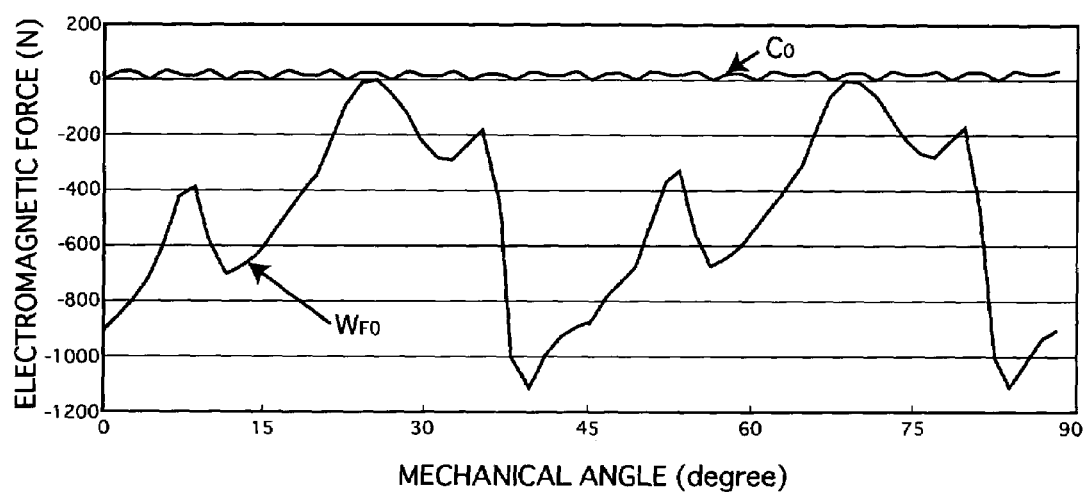
FIG. 8 is a characteristic diagram showing a relationship obtained by computations between the mechanical angle, a waveform of electromagnetic force acting on a first tooth of the stator with magnets arranged at an uneven pitch according to the first embodiment, and a waveform of a forty-eighth-order-mode component of the electromagnetic force waveform.

FIG. 8 shows a waveform $W_{F0}$ of electromagnetic force acting on the tooth 1 and a waveform $C_0$ of a forty-eighth-order-mode component of the electromagnetic force waveform $W_{F0}$ with respect to the mechanical angle in the electric machine with the uneven-pitched magnets shown in FIGS. 1 and 2. Although the waveform $C_0$ of the forty-eighth-order-mode component is not a sine curve, the electromagnetic force is decreased in the electric machine with the uneven-pitched magnets compared to in the electric machine with the even-pitched magnets shown in FIG. 5.

Figure 9:
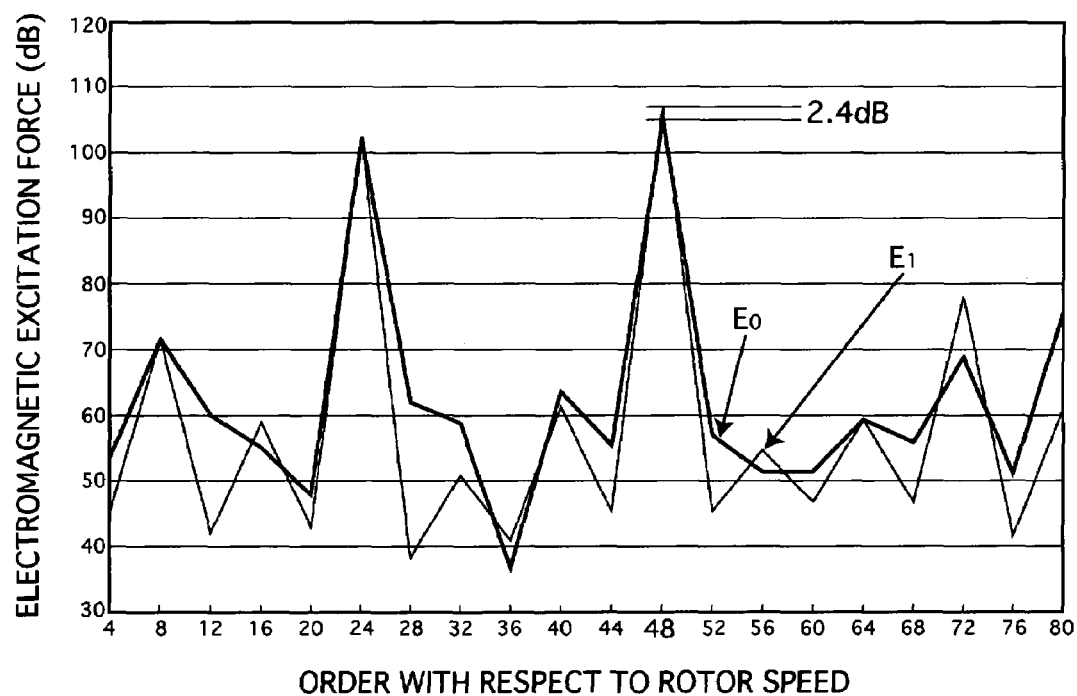
FIG. 9 is a frequency characteristic diagram of showing obtained by computations between the an order with respect to the rotor speed, a spectrum of electromagnetic excitation force causing the zeroth-order-mode circular vibration to the stator with the magnets arranged at the even pitch, and a spectrum of electromagnetic excitation force causing the zeroth-order-mode circular vibration to the magnets arranged at the uneven pitch shown in FIG. 2.

FIG. 9 is a frequency characteristic diagram showing a relationship between an order with respect to the rotor speed and spectrums of the electromagnetic excitation forces that cause the zeroth-order-mode circular vibration and are produced in the electric machines with the even-pitched magnets and in that with the uneven-pitched magnets, respectively. The electric machine with the even-pitched magnets has a spectrum $E_1$ of the electromagnetic excitation force, and the electric machine with the uneven-pitched magnets has a spectrum $E_0$ of the electromagnetic excitation force. FIG. 9 shows that the forty-eighth-order-mode component is decreased by 2.4 dB in the electric machine with the uneven-pitched magnets compared to in the electric machine with the even-pitched magnets.

Figure 10:
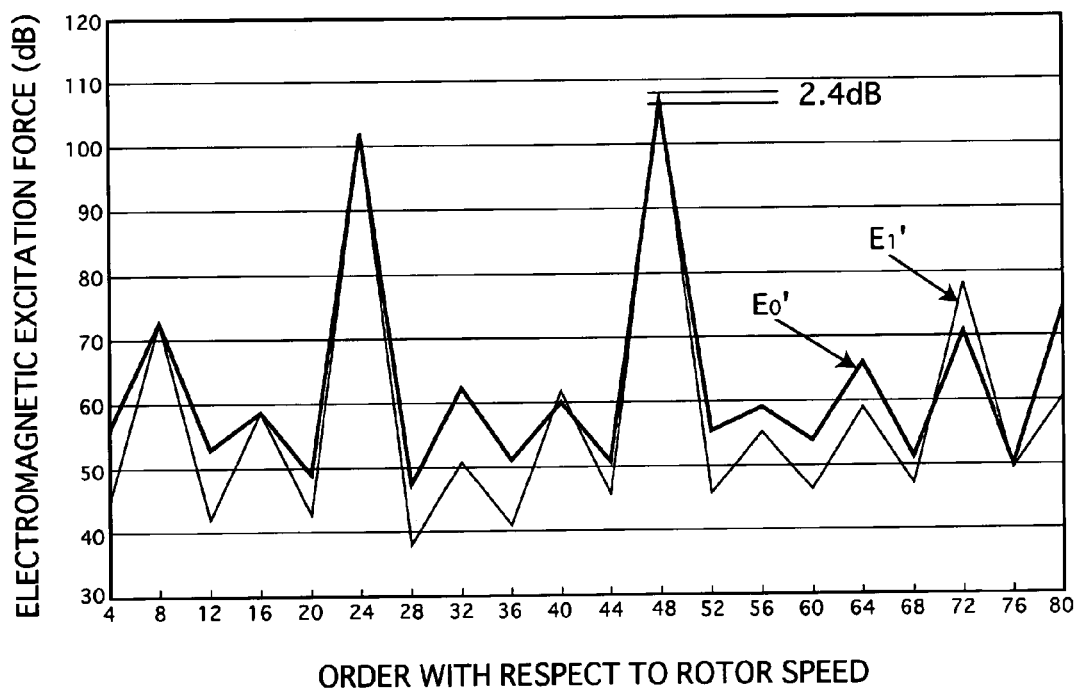
FIG. 10 is a frequency characteristic diagram showing obtained by computations between the an order with respect to the rotor speed, a spectrum of electromagnetic excitation force causing the zeroth-order-mode circular vibration to the stator with the magnets arranged at the even pitch, and a spectrum of electromagnetic excitation force causing the zeroth-order-mode circular vibration to the magnets arranged at another uneven pitch.

The pair of magnets may be set to be, for example, the magnets 51 and 54 instead of the magnets 51 and 55, where an angle between the magnets 51 and 54 is set Θ+3.75 degrees (Θ=135 degrees). FIG. 10 is a frequency characteristic diagram showing a relationship between an order with respect to the rotor speed and spectrums of the electromagnetic excitation forces that cause the zeroth-order-mode circular vibration and are produced in the electric machines with the even-pitched magnets and in that with the uneven pitched magnets shown in FIG. 2, respectively. The electric machine with the even-pitched magnets has a spectrum $E_1'$ of the electromagnetic excitation force, and the electric machine with the uneven-pitched magnets has a spectrum $E_0'$ of the electromagnetic excitation force. In this case, as shown in FIG. 10, the forty-eighth-order-mode component of the latter is decreased by 2.4 dB as well as in the case shown in FIG. 9 compared to that of the former.

The synchronous electric machine of the first embodiment has the following advantages.

At least one pair of the permanent magnets, consisting of the magnets 51 and 55 or the magnets 51 and 54 for example, is dislocated by a predetermined angle from positions where the permanent magnets 51 to 58 are arranged at the even pitch, and the predetermined angle is set to reduce electromagnetic excitation force acting on the teeth, which enables reduction of a high frequency electromagnetic excitation force of the stator 30 causing a high frequency noise.

When one pair of the magnets, the magnets 51 and 55 or the magnets 51 and 54 for example, is dislocated by the angle of ±360/(2n) degrees from the positions where they are arranged at the even pitch in the circumferential direction, where n is the integral number (value) of an order-mode of vibration to be decreased, the electromagnetic excitation force causing the zeroth-order-mode circular vibration of the stator can be decreased effectively, also reducing the high frequency motor noise.

Since n is set to be forty eight which is obtained by integral·(=2) multiplying the lowest common multiple (=24) of the phase-number (=3) of multi-phase currents applied to the windings and the number (=8) of the magnets 51 to 58 of the rotor 50, dislocating the pair of the magnets can decrease a high frequency noise which matters especially in a synchronous electric machine of three-phase type with a stator having forty eight teeth and a rotor having four-pole magnets.

A synchronous electric machine according to a second embodiment of the present invention will be described with reference to the accompanying drawings of FIGS. 11 to 13.

In this electric motor of the second embodiment, plural pairs of magnets are dislocated from positions where they are placed at an even pitch.

Figure 11:
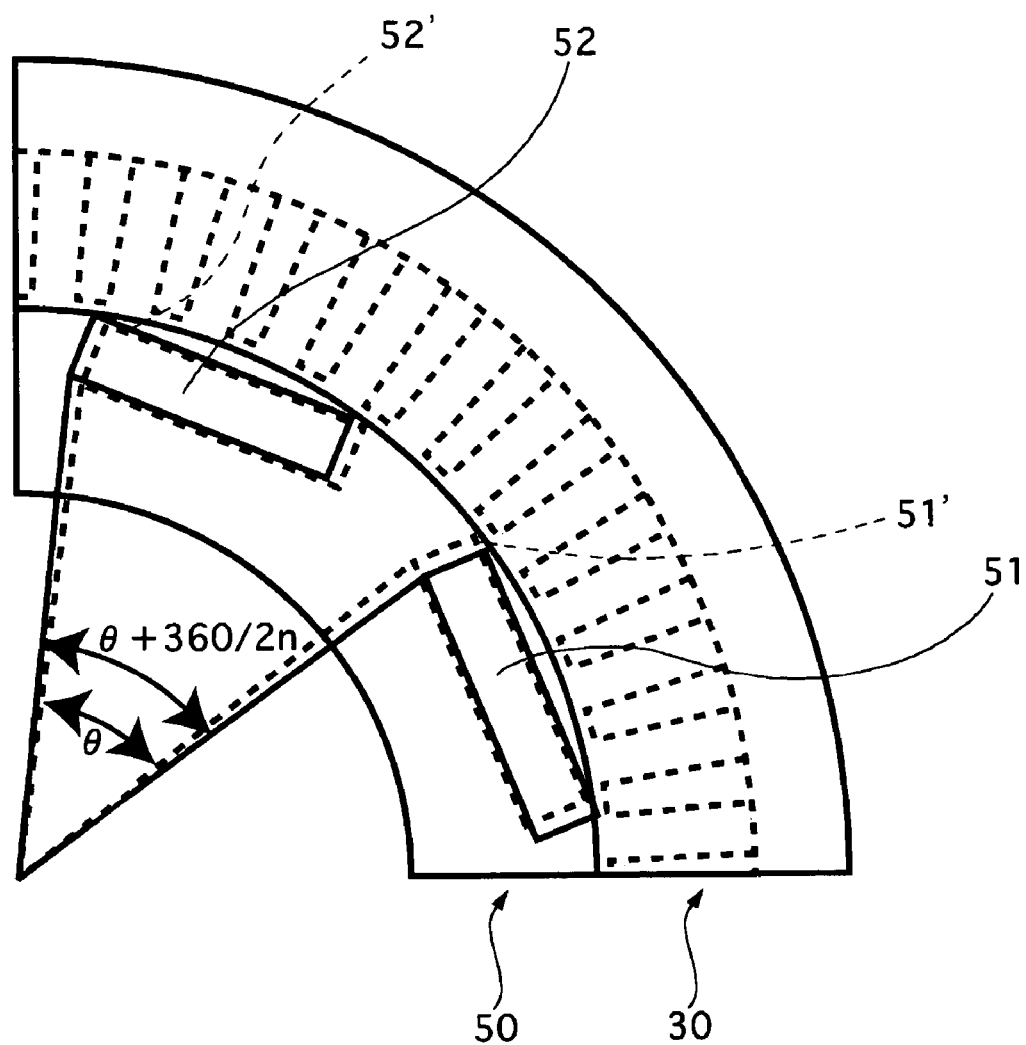
FIG. 11 is an enlarged fragmentary cross sectional view showing a stator and a rotor according to a second preferred embodiment of the present invention.

FIG. 11 shows a cross sectional view of a quarter of a stator 30 and a rotor 50 of the electric machine of the second embodiment, where a pair of magnets 51 and 52 in the same pole pair is set so that they are located to have the angle Θ3.75 degrees (Θ=45 degrees in this case, where Θ is an angle between magnets 51' and 52' respectively corresponding to the magnets 51 and 52 and positioned at the even pitch) therebetween: the magnets 51 and 52 are displaced by 3.75 degrees from positions where they are positioned at the even pitch. In addition, a pair of magnets 53 and 54, a pair of magnets 55 and 56, and a pair of magnets 57 and 58, which are not shown but correspond to the magnets shown in FIG. 2, are dislocated by +3.75 degrees to be a symmetric relation with one another with respect to 0 degree and 90 degrees. The other parts are constructed similarly to those of the first embodiment.

Figure 12:
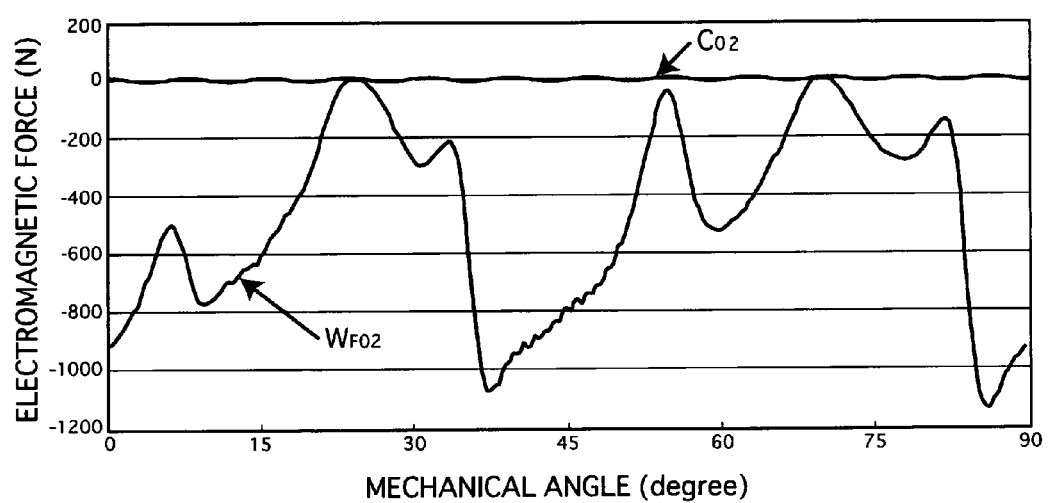
FIG. 12 is a characteristic diagram showing a relationship obtained by computations between a mechanical angle, a waveform of electromagnetic force acting on a first tooth of the stator with magnets arranged at an uneven pitch according to the second embodiment, and a waveform of a forty-eighth-order-mode component of the electromagnetic force waveform.
Figure 13:
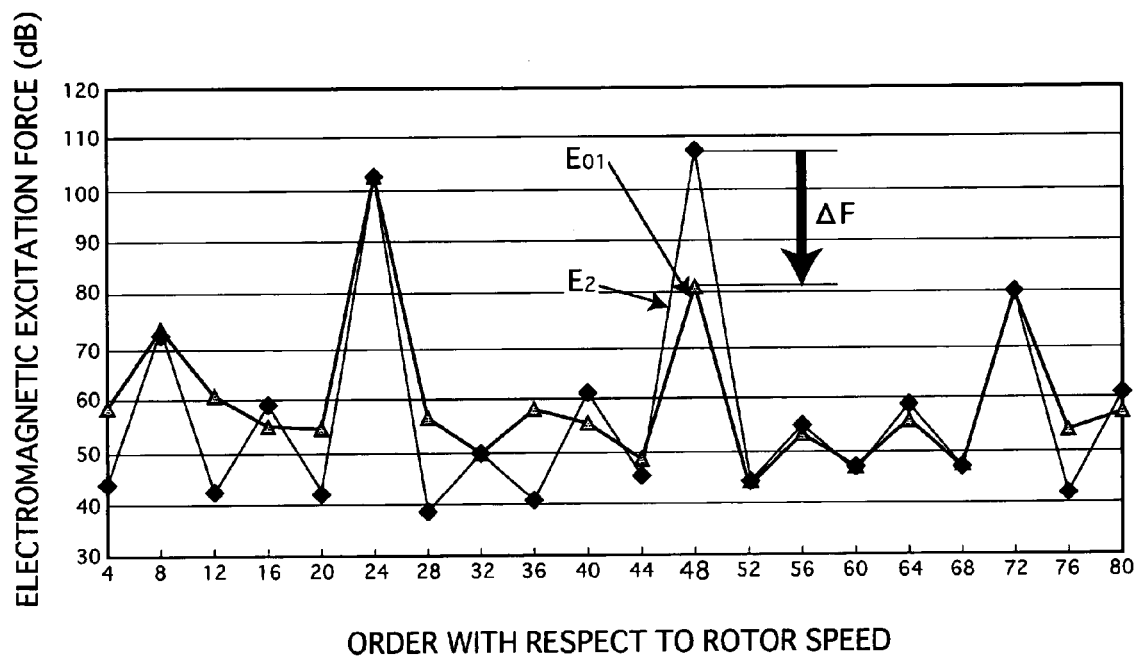
FIG. 13 is a frequency characteristic diagram showing obtained by computations between an order with respect to the rotor speed, a spectrum of electromagnetic excitation force causing the zeroth-order-mode circular vibration to the stator with the magnets arranged at the even pitch, and a spectrum of electromagnetic excitation force causing the zeroth-order-mode circular vibration to the magnets arranged at the uneven pitch shown in FIG. 11.

FIG. 12 shows characteristic diagram of a waveform $W_{F02}$ of electromagnetic force acting on a first tooth of the stator 30 and a waveform $C_{02}$ of a forty-eighth-order-mode component of the electromagnetic force waveform $W_{F02}$ in the electric machine with the rotor 50 having four pairs of the magnets arranged at the uneven pitch to be each dislocated by 3.75 degrees from positions where they are arranged at an even pitch. In the electric machine of the second embodiment, the forty-eighth-order-mode component of the electromagnetic force becomes smaller than in that of the first embodiment. FIG. 13 is a frequency characteristic diagram showing a relationship between an order with respect to the rotor speed and spectrums of the electromagnetic excitation forces that cause the zeroth-order-mode circular vibration and are produced in the electric machines with the even-pitched magnets and in that with the uneven-pitched magnets shown in FIG. 11, respectively. The electric machine with the even-pitched magnets has a spectrum $E_2$ of the electromagnetic excitation force, and the electric machine with the uneven-pitched magnets has a spectrum $E_{01}$ of the electromagnetic excitation force. In this case, as shown in FIG. 13, the forty-eighth-order-mode component of the latter is decreased by more than 20 dB, as indicated as $\Delta F$ in FIG. 13, compared to the former.

In general, a pair of the magnets are dislocated by the angle $\pm 360/(2n)$ degrees from positions where they are arranged at an even pitch, where n is the order to be decreased of the vibration mode, which can produce nth-order-mode electromagnetic excitation force in reverse phase acting on a tooth, thereby decreasing zeroth-order-mode electromagnetic excitation force.

When setting the pairs of magnets, the dislocated directions of the magnet pairs can be set to give a rotational balance to the rotor because the amount of the dislocated angles are set the same value.

Furthermore, when the pairs of the magnets are dislocated by different angles according to plural integral numbers n, for example n=24, 48, a twenty-fourth-order-mode and a forty-eighth-order-mode electromagnetic excitations can be decreased at a time.

The electric machine of the second embodiment has the following advantages in addition to the advantages of the first embodiment.

Dislocating plural pairs of the magnets enables zeroth-order-mode electromagnetic excitation force to be smaller than the first embodiment.

When plural pairs of the magnets are dislocated, the dislocated angles of them are set to the same value, +360/(2n) or −360/(2n), which enables the rotor 50 to rotate at a high rotational speed with keeping its rotational balance.

Since the dislocated angle is computed by using integral multiples integral numbers n that have different values, for example n=24, 48, the corresponding order (24 and 48) mode electromagnetic excitations can be reduced by superposition.

While there have been particularly shown and described with reference to preferred embodiments thereof, it will be understood that various modifications may be made therein, and it is intended to cover in the appended claims all such modifications as fall within the true spirit and scope of the invention.

For example, the synchronous electric machines of the first and second embodiments reduce the forty-eighth-order-mode electromagnetic excitation force, which is not limited in the present invention. For example, an electric machine of the present invention may reduce twenty-fourth-order-mode electromagnetic excitation by using a dislocated angle of $\pm 360/(2 \times 24)$ degrees=$\pm 7.5$ degrees.

Instead of the above-structured electric machine, the electric machine having different pole pairs, different teeth number, or different phase number may be used.

The electric machine of the present invention may be a synchronous electric motor, a synchronous electric generator, or a synchronous motor/generator.

The entire contents of Japanese Patent Application No. 2004-069222 filed Mar. 11, 2004 is incorporated herein by reference.

What is claimed is:

1. A synchronous electric machine comprising:
 a stator provided with teeth wound around by windings capable of generating electromagnetic fields; and
 a rotor with permanent magnets generating magnetic fields, said rotor being capable of rotating by interaction of the electromagnetic fields of said windings and the magnetic fields of said permanent magnets; wherein
 said permanent magnets are arranged at even pitch except at least one pair of said permanent magnets are dislocated by a predetermined angle from positions corresponding to the even pitch, the predetermined angle being set to reduce electromagnetic excitation force acting on said teeth.

2. The synchronous electric machine of claim 1, wherein the predetermined angle is determined based on an integral number n, the integral number n being set to be an order-mode value of vibration generated by the electromagnetic excitation force to be reduced.

3. The synchronous electric machine of claim 2, wherein only one pair of said permanent magnets is dislocated and the predetermined angle is set substantially to $\pm 360/(2 \times n)$ degrees.

4. The synchronous electric machine of claim 3, wherein the integral number n is determined by integral-multiplying the lowest common multiple of the phase-number of multi-phase currents applied to said windings and the number of said permanent magnets of said rotor.

5. The synchronous electric machine of claim 2, wherein the integral number n is determined by integral-multiplying the lowest common multiple of the phase-number of multi-phase currents applied to said windings and the number of said permanent magnets of said rotor.

6. The synchronous electric machine of claim 2, wherein the plural pairs of the permanent magnets are dislocated and the predetermined angle is one of $+360/(2 \times n)$ degrees and $-360/(2 \times n)$ degrees in each of the pairs.

7. The synchronous electric machine of claim 6, wherein the integral numbers n are determined by integral-multiplying the lowest common multiple of the phase-number of multi-phase currents applied to said windings and the number of said permanent magnets of said rotor.

8. The synchronous electric machine of claim 7, wherein said permanent magnets of the plural pairs each have the same pole pairs.

9. The synchronous electric machine of claim 8, wherein the integral numbers n are set to be different from each other between the plural pairs of the permanent magnets.

10. The synchronous electric machine of claim 7, wherein the integral numbers n are set to be different from each other between the plural pairs of the permanent magnets.

11. The synchronous electric machine of claim 6, wherein the permanent magnets of the plural pairs each have the same pole pairs.

12. The synchronous electric machine of claim 11, wherein the integral numbers n are set to be different from each other between the plural pairs of the permanent magnets.

13. The synchronous electric machine of claim 6, wherein the integral numbers n are set to be different from each other between the plural pairs of the permanent magnets.

14. The synchronous electric machine of claim 1, wherein the permanent magnets of the at least one pair each have the same pole pairs.

15. The synchronous electric machine of claim 2, wherein the integral numbers n are set to be different from each other between the plural pairs of the permanent magnets.

* * * * *